United States Patent [19]

Feutrel

[11] Patent Number: 4,617,171
[45] Date of Patent: Oct. 14, 1986

[54] DEVICE FOR FIXING A GUIDE TUBE IN A RECESS ON THE END FITTING OF A NUCLEAR REACTOR FUEL ASSEMBLY

[75] Inventor: Claude Feutrel, Vauhallan, France

[73] Assignee: Commissariat a l'Energie Atomique, Paris, France

[21] Appl. No.: 507,060

[22] Filed: Jun. 23, 1983

[30] Foreign Application Priority Data

Jul. 1, 1982 [FR] France ................................. 82 11572

[51] Int. Cl.[4] ............................................... G21C 3/32
[52] U.S. Cl. .................................... 376/446; 376/449; 376/285
[58] Field of Search ............... 376/353, 285, 446, 449, 376/364, 363, 203, 204; 411/44, 45, 54, 57, 60, 338, 339

[56] References Cited

U.S. PATENT DOCUMENTS

| | | | |
|---|---|---|---|
| 3,266,364 | 8/1966 | Becker | 411/44 |
| 3,791,466 | 2/1974 | Patterson et al. | 376/442 |
| 4,194,948 | 3/1980 | Ledin | 376/203 X |
| 4,303,476 | 12/1981 | Leclercq | 376/446 |
| 4,313,797 | 2/1982 | Attix | 376/353 X |
| 4,348,353 | 9/1982 | Christiansen et al. | 376/446 X |
| 4,416,848 | 11/1983 | Feutrel | 376/446 X |

FOREIGN PATENT DOCUMENTS

| | | | |
|---|---|---|---|
| 0041014 | 12/1981 | European Pat. Off. . | |
| 0046308 | 6/1966 | Fed. Rep. of Germany | 376/364 |
| 2428980 | 1/1975 | Fed. Rep. of Germany | 376/449 |
| 3020114 | 12/1981 | Fed. Rep. of Germany | 376/353 |
| 1268775 | 6/1961 | France | 376/364 |
| 1511234 | 1/1968 | France . | |
| 1536527 | 8/1968 | France . | |
| 1585236 | 1/1970 | France . | |
| 2049108 | 3/1971 | France . | |
| 2368785 | 5/1978 | France . | |
| 2473773 | 7/1981 | France . | |
| 2493024 | 4/1982 | France | 376/446 |
| 0894471 | 4/1962 | United Kingdom | 376/363 |
| 1204125 | 9/1970 | United Kingdom | 376/364 |
| 2054081 | 2/1981 | United Kingdom . | |

Primary Examiner—Deborah L. Kyle
Assistant Examiner—Dan Wasil
Attorney, Agent, or Firm—Kerkam, Stowell, Kondracki & Clarke

[57] ABSTRACT

Device for the dismantlable fixing of a guide tube in a recess provided for this purpose in the end piece of a fuel assembly of a nuclear reactor, particularly of the water-cooled type, wherein the guide tube has an end fitting, whose ferrule-like end has an inner cylindrical profile slotted over its entire length into a certain number of flexible sectors which can be engaged in an annular recess, or on a bore having circular engagement threads on its surface, under the pressure of an internal cylindrical locking ring, means also being provided for braking the locking ring in axial translation with respect to the end piece and for remotely ensuring the dismantling of the ring.

12 Claims, 7 Drawing Figures

DEVICE FOR FIXING A GUIDE TUBE IN A RECESS ON THE END FITTING OF A NUCLEAR REACTOR FUEL ASSEMBLY

BACKGROUND OF THE INVENTION

The present invention relates to fuel assemblies for nuclear reactors and more particularly for pressurized water-cooled reactors. More specifically the invention relates to improvements to the guide tubes of such fuel assemblies, whose construction will be briefly described hereinafter.

For the description of fuel assemblies for known water-cooled reactors, reference can be made to French Patent Nos. 1 536 527 and 70 18 102 of the Westinghouse Electric Corporation. In elements of the type described in these patents, the nuclear fuel of the reactor is distributed in the form of a plurality of fuel rods located in the reactor core, the distribution being in the form of generally square, juxtaposed assemblies. Each fuel assembly extending over a length of several metres and having a rigid mechanical structure is supported between the upper and lower core plates. This structure has an upper end piece and a loser end piece, provided with orifices permitting the passage of the cooling water, which circulates vertically from bottom to top, and a certain number of guide tubes ensuring the cohesion of the assembly by their fixture to the upper and lower end pieces, for which they thus serve as spacers. A certain number of supporting grids arranged along each assembly and which are traversed by guide tubes and defined square cells, permit the passage and transverse supporting of the rods, which are themselves placed on the lower end piece.

In an also known manner, apart from their function of the mechanical cohesion of the assembly, said guide tubes serve to house absorbent rods used for controlling the chain reaction at any time and which are inserted as rapidly as possible into the assembly, through the upper end piece which is perforated for this purpose, when it is desired, for any random reason, to bring about a rapid shutdown of the reactor.

Conventionally, the end pieces of the fuel assemblies are made from stainless steel, i.e. a material having a relatively high neutron absorption, whereas the guide tubes are made from zircaloy having much less favourable neutron absorption properties. This difference between the materials makes it relatively difficult to solve the problems of connecting the guide tubes and the end plates.

In known constructions, the guide tube is fixed to the upper end piece of the assembly by means of an intermediate sleeve made from a material compatible with that of the end piece, because it is not possible to directly weld the zircaloy guide tube to the steel member. Thus, it is necessary to use a steel sleeve fitted on to the outer surface of the upper part of the guide tube and secured by means of a certain number of mechanical deformations ensuring the fixing of the sleeve to the guide tube. This sleeve is itself welded or brazed on the one hand to the upper end piece, and on the other hand to the upper grid, thus ensuring the mechanical connection of the end piece to the structural assembly.

However, these arrangements lead to a certain number of serious disadvantages, particularly with regards to the possibilities of the remote disassembly or detachment of the upper end piece, e.g. in a pond, for replacing a defective fuel rod.

In order to make the connections used for fitting the guide tube to the upper end piece of a fuel assembly dismantlable, various solutions equipped with screwing means are used. Although in theory such systems make it possible to effectively obtain disengageable connections, practical requirements make it very difficult to produce such solutions which are not open to criticism. Thus, a certain number of criteria, most important of which are referred to hereinafter, make the construction of such disengageable fixtures particularly difficult. Thus, to be acceptable, it is desirable for such a connection:

not to cause axial torsion or twisting of the guide tube during its screwing or unscrewing,
not to require the prior angular positioning of the parts to be assembled,
not lead to risk of the threads seizing, particularly during dismantling after an irradiation period,
to provide a safety restraint of the system in order to provide any accidental slackening,
to permit easy remote disassembly, bearing in mind the operating conditions in a storage pond, and
to permit easy reintroduction of the upper end plate onto the end fittings of free guide tubes.

SUMMARY OF THE INVENTION

The present invention relates to a device for the dismantlable fixing of a guide tube in a bore of a nuclear reactor fuel assembly end piece, which, whilst having a simple design, makes it possible to satisfy the various conditions referred to hereinbefore.

This dismantlable fixing device essentially comprises the guide tube having an end fitting in the form of a ferrule, whose end is slotted over its entire height into a certain number of flexible sectors, which can be engaged in an annular recess provided for this purpose on the periphery of each bore under the action of an inner locking ring having a conical bushing corresponding to the internal diameter of the end fitting so as to be inserted therein, means also being provided for fixing the locking ring in axial translation with respect to the end piece and for remotely ensuring the disengagement of the ring.

As can be seen, the fixing device according to the invention has no thread and its operation is essentially based on the use of a cone effect between three parts, namely the end fitting of the guide tube, a locking ring and the upper end plate of the fuel assembly.

Moreover, its realization requires no angular positioning of the parts prior to their joining or any rotation thereof, whereby they can all revolve and can be coupled in any respective angular position. According to the invention, the angular recess provided on the periphery of each bore of the upper end plate for permitting the fixing of flexible sectors constituting the end fitting of the guide tube can be in numerous equivalent forms for achieving the sought technical result.

For example, according to a first embodiment of the device according to the invention, this annular recess "in intaglio" corresponds to a cylindrical shoulder with conical connections, provided in relief on the outer periphery of each of the flexible sectors.

In a further variant, this recess is a spherical annular chamber corresponding to a spherical segment constituting the outer surface of the flexible sectors.

In another embodiment, the recess is an annular cylindrical chamber having a biconical or rectangular profile, corresponding to that of the outer surfaces of the ends of the flexible sectors.

In the same way, the means provided for braking the locking ring in axial translation with respect to the end piece of the assembly can be in three different forms.

In a first construction, these means essentially comprise two annular cylindrical grooves having a parallelepipedic cross-section and which face one another in the end piece and in the locking ring, as well as an elastic O-ring, which can be placed in the space constituted by the two grooves.

In a second construction, said same means essentially comprises an annular cylindrical groove formed in the outer face of the locking ring, a removal preventing ramp being provided in front of the flexible sectors of the end fitting, whilst an elastic O-ring can be placed in the annular space formed in this way between the groove and the ramp.

In a third construction, the means for fixing the locking ring in axial translation consist of a certain number of seating points of the said ring in the end piece, constituted by "breaks" on the wall of the ring introduced into an annular groove formed in front of the wall of the bore of said end piece.

According to the invention, the means provided for ensuring the remote dismantling of the locking ring consist of an annular cylindrical groove formed in the inner wall of the ring and able to receive a device with lugs introduced from the outside.

Finally, according to a secondary feature of the invention, the end fitting of each guide tube is provided with a shoulder acting as an abutment to facilitate its positioning in axial translation in front of the end piece of the fuel assembly.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
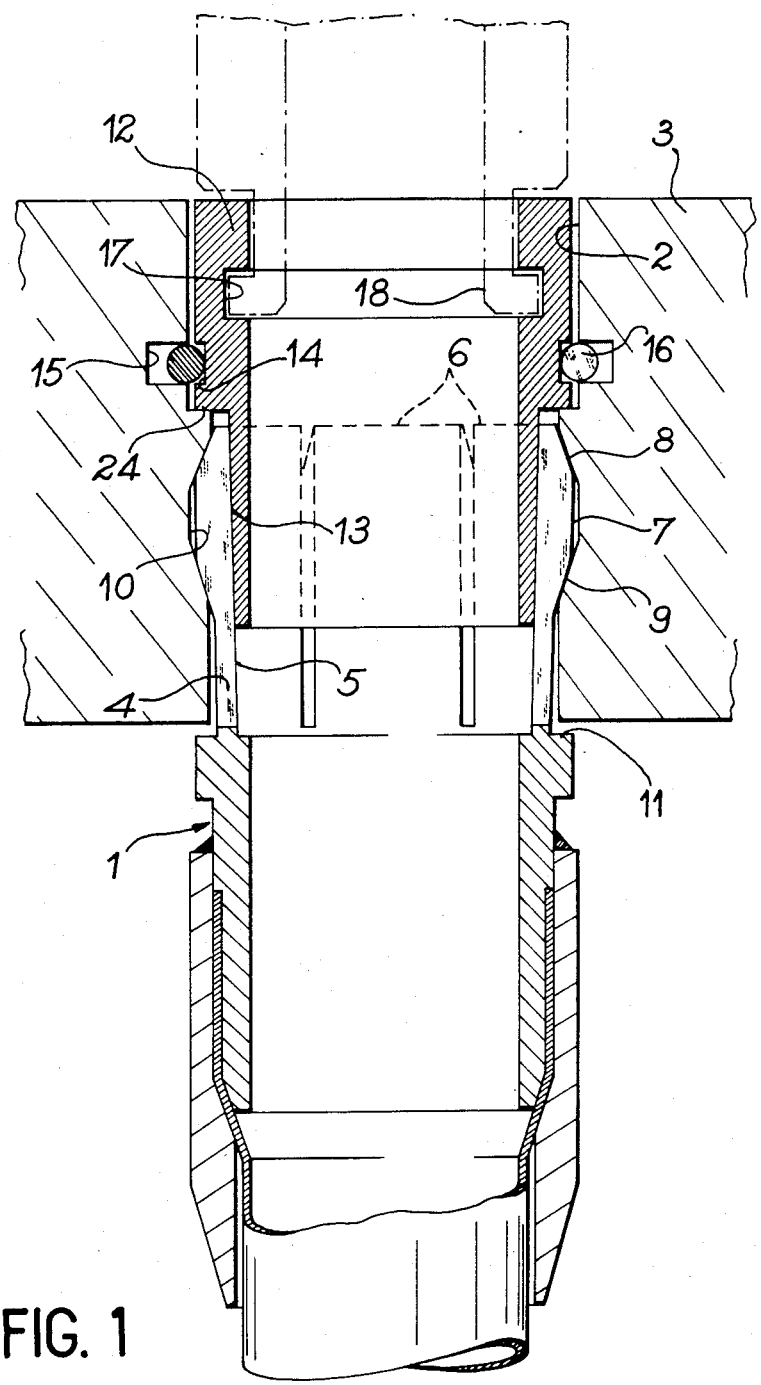
FIG. 1 in section, a first embodiment of the dismantlable fixing device according to the invention.

FIG. 1 shows the end fitting 1 of a guide tube of a pressurized water-cooled nuclear reactor fuel assembly and the device according to the invention permits the fixing in a bore 2 of the upper end piece 3 of said same assembly.

According to the invention, the upper part 4 of end fitting 1 is in the form of a ferrule, whereof the internal profile 5 is machined in the form of a cylinder. Moreover, this ferrule-like part is slotted over its entire height so as to give a certain number of flexible sectors 6, e.g. six sectors. Each of the flexible sectors 6 has an external profile having in the centre a cylindrical shoulder 7, connected to two conical parts 8, 9. The system can be engaged in an annular recess 10 with the same profile, machined in the end piece 7 so as to define an axial penetration height of guide tube 1 in plate 3. For the same purpose, a shoulder 11 serves as a safety abutment for the fitting of end fitting 1 and it is not normally in contact with end piece 3.

According to the invention, an internal cylindrical locking ring 12, provided with a frustoconical bushing 13 to be introduced into bore 5, makes it possible to lock the flexible sectors 6 in annular recess 10.

For completing the fixing device, means are provided for restraining the locking ring 12 against axial translation with respect to end piece 3 and essentially comprise two cylindrical grooves 14, 15, hollowed out in facing manner and respectively in locking ring 12 and in the bore of end piece 3, thus defining a space in which is placed an elastic O-ring 16, whose displacement ensures the axial positioning of locking ring 12.

Finally, the internal periphery of ring 12 carries an annular cylindrical groove 17 able to receive a device with lugs 18, introduced from the outside of end piece 3 and which is used for the remote disassembly of locking ring 12 and the complete fixing device.

Figure 2:
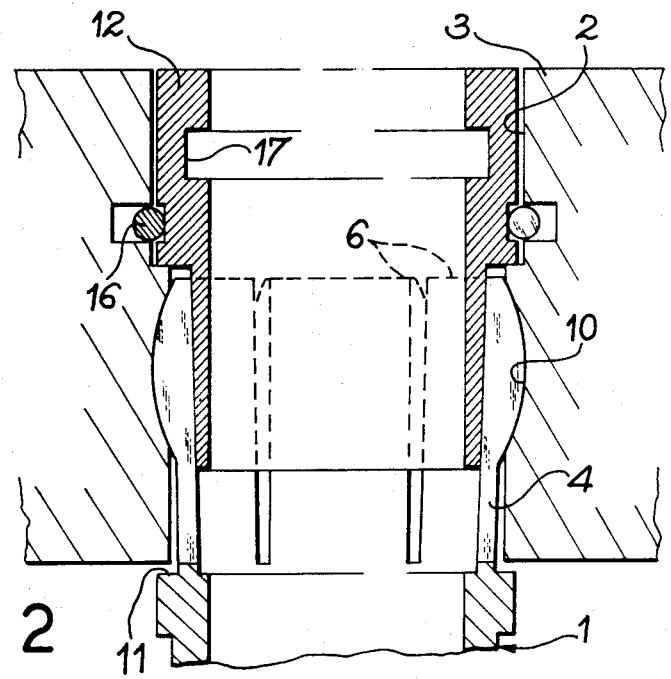
FIG. 2 a first variant of the embodiment of FIG. 1.

In the variant of FIG. 2, the same elements as described relative to FIG. 1 carry the same reference numerals. However, in this case, recess 10 for the different flexible sectors 6 and provided in the wall of end piece 3 is a spherical annular hollow chamber corresponding to a spherical segment of the same profile on the outer surface of sectors 6 of end fitting 4. The operation of the device of FIG. 2 is exactly the same as that of FIG. 1.

Figure 3:
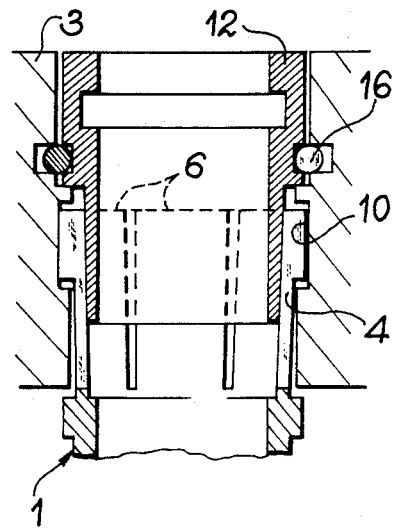
FIG. 3 a second variant of the same embodiment.

In FIG. 3 is shown a variant in which the same recess 10 is constituted by a hollow annular chamber having a rectangular cylindrical profile in end piece 3, which corresponds to a shoulder in relief of the same cross-section on end 4 of end fitting 1. In this variant, there can be a certain axial clearance between end 4 of end fitting 1 and end plate 3, which compensates the height difference of the guide tubes.

Figure 4:
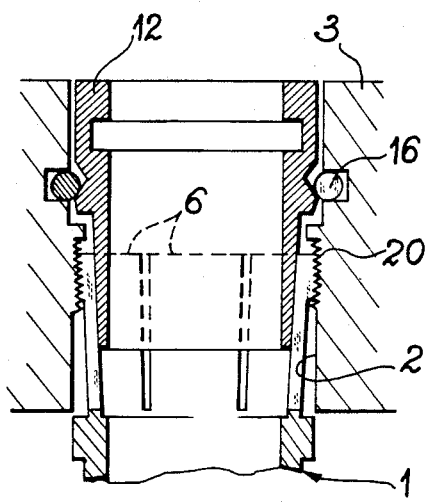
FIG. 4 a third variant of the same embodiment.

In another variant shown in FIG. 4, it is once again possible to find all the essential components of the invention carrying the same references as in FIGS. 1 to 3. However, in this case, the axial position of guide tube 1 is defined with respect to end piece 3 by a certain number of circular attachment threads 20 in relief on the end of end fitting 4 and in intaglio on the inner wall of end piece 3. When the corresponding threads are engaged, the end fitting of guide tube 1 is in a fixed axial position with respect to end piece 3, no matter what the penetration of ring 12.

Figure 5:
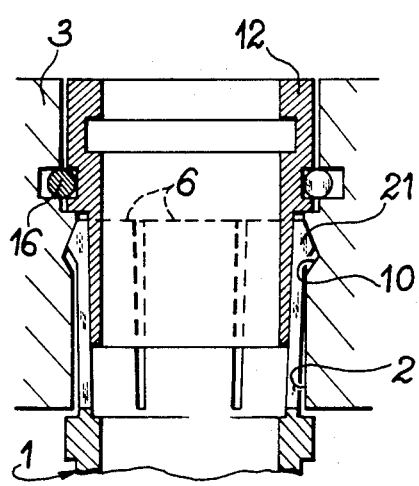
FIG. 5 a fourth variant of the same embodiment.

FIG. 5 shows another variant of the fixing device according to the invention, in which the definition of the axial position of the end of end fitting 1 in bore 2 is brought about by a shoulder 21 having a biconical profile and located on the outer periphery of the end of the flexible sector 6. This shoulder is placed in a groove 10 having the same profile and which faces end piece 3.

Figure 6:
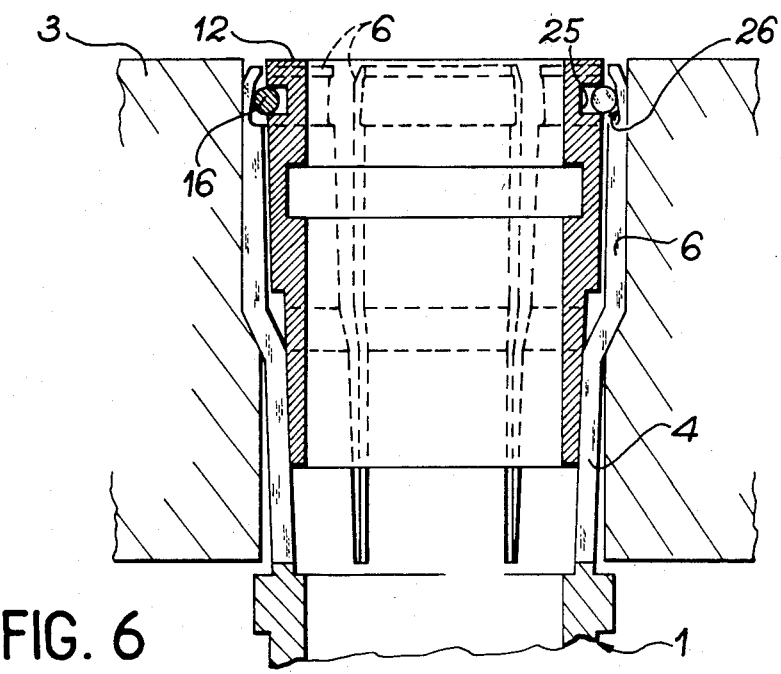
FIG. 6 a variant in which the axial restraining of the locking ring by the O-ring takes place directly on the flexible sectors of the guide tube end fitting.

FIG. 6 shows a variant in which the means for restraining the locking ring 12 against axial translation differ from those of the other embodiments and variants. In the case of FIG. 6, said means have a cylindrical groove 25 formed in the outer face of locking ring 12 and a removal preventing ramp 26 formed facing the aforementioned groove in the flexible sectors 6 of end fitting 4 of guide tube 1. In the annular space formed in this way between groove 26 and ramp 26, an elastic O-ring 16 ensures the direct braking of locking ring 12 on the flexible sectors 6 of the ferrule-like end fitting. Thus, this variant makes it possible to dissociate the braking of the locking ring 12 from a possible axial displacement between end fitting 4 and end piece 3.

Figure 7:
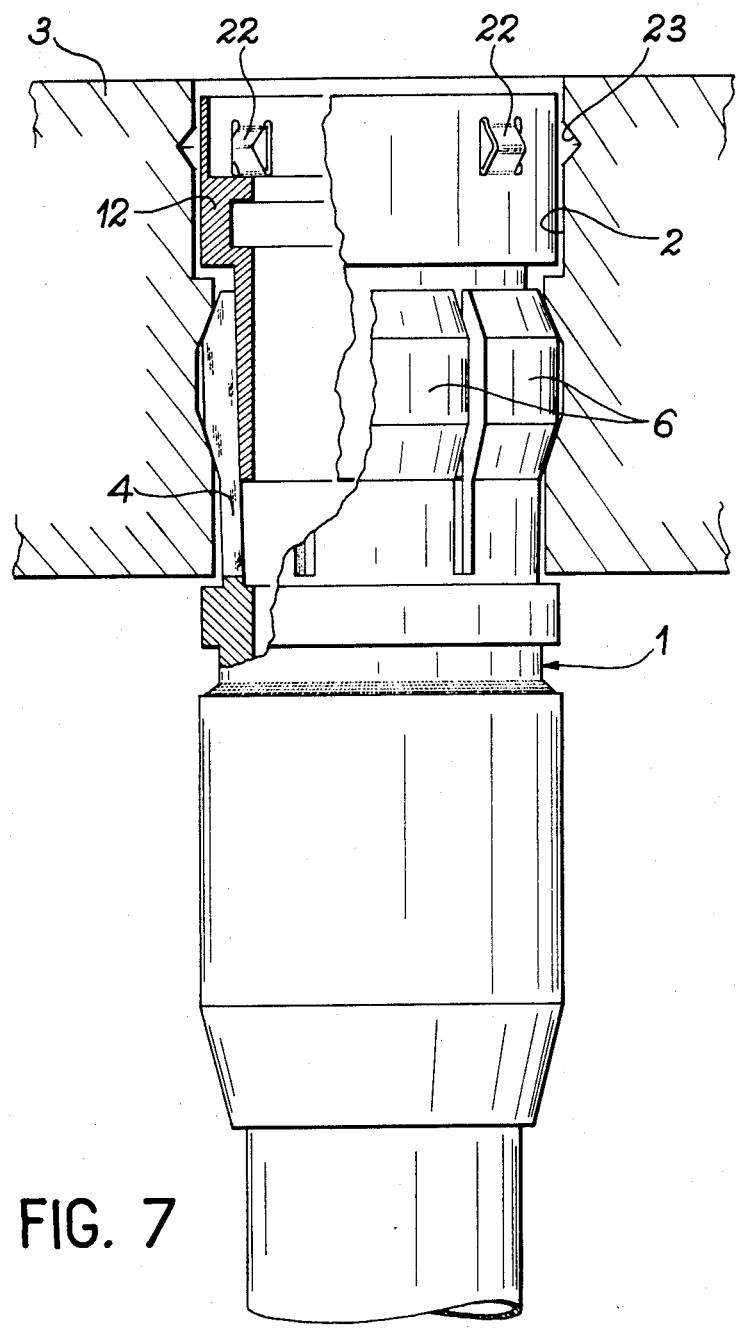
FIG. 7 a possible construction of the means for braking the locking ring in axial translation with respect to the end piece.

Finally, FIG. 7 shows another possible embodiment of the device for restraining locking ring 12 against axial translation. In this case, the fixture is obtained with the aid of a certain number of seating points of ring 12 in end piece 3, formed by flexible breaks such as 22 in the inner wall of ring 12, which penetrate an annular groove 23 having a corresponding cross-section and positioned in facing manner in wall 2 of the bore of said end piece. The other arrangements in the embodiment of FIG. 7 are identical to those of FIG. 1 and will consequently not be described again.

For all the embodiments described hereinbefore, the operation of the dismantlable fixing device according to the invention essentially comprises the following stages.

The end fitting 4 of guide tube 1 is introduced into end piece 3 in a random azimuthable position, by using the flexibility of the slotted flexible sectors 6 forming the ferrule-like end fitting of guide tube 1. The end of end fitting 4 is then positioned with the aid of one of the means described hereinbefore in the annular recess, provided for this purpose on the periphery of each groove and having a profile corresponding to that of the end of the end fitting. If necessary, shoulder 11 serves as a positioning control abutment. The inner locking ring 12 is then introduced until contact on shoulder 24 is obtained, this position corresponding to the engagement of O-ring 16 in grooves 14, 15 and ensuring that the ring 12, restrained against translation in this way, is retained in position. The limited conicity given to bushing 13 of ring 12 as well as to the different profiles 5 of parts 6 ensures this penetration of ring 12, whilst permitting it to support the ends of end fitting 4 in annular recess 10, provided for this purpose in end piece 3. At this time, the different sectors 6 of end fitting 4 are secured in the end piece.

If necessary, a slight positioning correction of end fitting 4 in annular recess 10 of end piece 3 can be automatically brought about under the effect of the radial pressure exerted by the conical bushing or end 13 of locking ring 12 and the reaction of the conical parts of bushing 13 and the flexible sectors 6 which are in contact. Reference is made to the self-locking nature of the fixing devices according to the invention because, when axial stresses are exerted on end fitting 1, no matter whether in tension or in compression, the radial component developing in contact with the conical surfaces 5 and 13 reinforces the locking of conical bushing 13 of locking ring 12.

I claim:

1. A dismantlable fuel assembly for a nuclear reactor of the water cooled type, said fuel assembly comprising:
   a guide tube;
   an end piece having a bore for receiving said guide tube;
   said guide tube having a ferrule-like end with an inner cylindrical wall, an outer cylindrical wall, and being slotted to define a plurality of flexible sectors;
   said end piece bore and said guide tube end having respective matching internal and external configurations for fixing said bore and guide tube end against any relative axial movement when said configurations are engaged;
   a cylindrical locking ring insertable by axial translation into said guide tube end and having a frusto-conical external surface radially engaging said sectors for deforming said sectors of said ferrule-like end as said locking ring is inserted to urge said external configuration into engagement with said internal configuration by radial force only; and
   means for restraining said locking ring against axial movement, said means for restraining permitting removal of said locking ring by application of axial extraction force.

2. A dismantlable fuel assembly in accordance with claim 1, wherein said internal configuration of said bore comprises an annular recess.

3. A dismantlable fuel assembly in accordance with claim 1, wherein said internal configuration of said bore comprises a set of circular threads.

4. A dismantlable fuel assembly in accordance with claim 2, wherein said external configuration of said guide tube end comprises an annular shoulder of frusto-conical cross-section, and wherein said annular recess in said end piece bore corresponds to said annular shoulder.

5. A dismantlable fuel assembly in accordance with claim 2, wherein said external configuration of said guide tube end comprises an annular shoulder of semi-circular cross-section, and wherein said annular recess in said end piece bore corresponds to said annular shoulder.

6. A dismantlable fuel assembly in accordance with claim 2, wherein said external configuration of said guide tube end comprises an annular shoulder of rectangular cross-section, and wherein said annular recess in said end piece bore corresponds to said annular shoulder.

7. A dismantlable fuel assembly in accordance with claim 2, wherein said external configuration of said guide tube end comprises an annular shoulder of triangular cross-section, and wherein said annular recess in said end piece bore corresponds to said annular shoulder.

8. A dismantlable fuel assembly in accordance with claim 1, wherein said means for restraining said locking ring against axial movement comprises two annular cylindrical grooves arranged in facing manner in said end piece and locking ring, and an elastic O-ring located in the space formed by the two grooves.

9. A dismantlable fuel assembly in accordance with claim 1, wherein said means for restraining said locking ring against axial movement comprises an annular cylindrical groove formed in the outer face of the locking ring, a removal-preventing ramp facing the flexible sectors of the end fitting, and an elastic O-ring located in an annular space defined between said groove and said ramp.

10. A dismantlable fuel assembly in accordance with claim 1, wherein said means for permitting removal of said locking ring comprises an annular cylindrical groove formed in the inner wall of the ring for receiving a tool.

11. A dismantlable fuel assembly in accordance with claim 1, wherein said guide tube end is provided, at its base, with an annular shoulder serving as an abutment for axial positioning in the end piece of the assembly.

12. A dismantlable fuel assembly for a nuclear reactor of the water cooled type, said fuel assembly comprising:
   a guide tube;

an end piece having a bore for receiving said guide tube;

said guide tube having a ferrule-like end with an inner cylindrical wall, an outer cylindrical wall, and being slotted to define a plurality of flexible sectors;

said end piece bore and said guide tube end having respective matching internal and external configurations for fixing said bore and guide tube end against any relative axial movement when said configurations are engaged;

a cylindrical locking ring insertable by axial translation into said guide tube end having a frustoconical external surface radially engaging said sectors for deforming said sectors of said ferrule-like end as said locking ring is inserted to urge said external configuration into engagement with said internal configuration by radial force only; and a plurality of seating points for restraining said locking ring against axial movement while permitting removal of said locking ring by application of axial extraction force, said seating points being formed by flexible breaks in a wall of said locking ring and cooperating with an annular groove arranged in facing manner in the wall of said end piece bore.

* * * * *